M. BRENEMAN.
Cultivator.
No. 61,512.  Patented Jan 29, 1867.
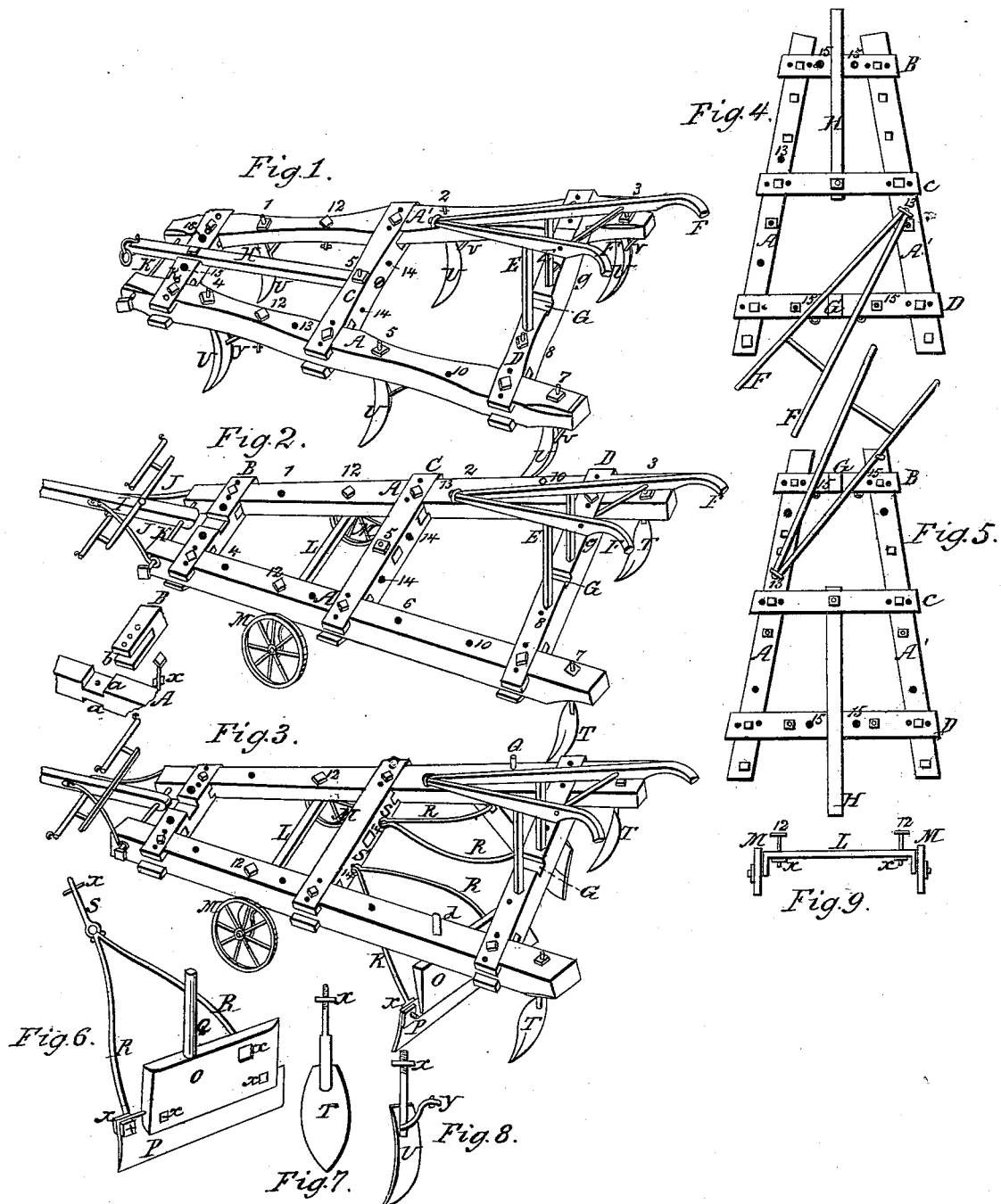

United States Patent Office.

MARTIN BRENEMAN, OF EAST DONEGAL TOWNSHIP, PENNSYLVANIA, ASSIGNOR TO HIMSELF AND SAMUEL EBY, OF ELIZABETHTOWN, PENNSYLVANIA.

Letters Patent No. 61,512, dated January 29, 1867.

IMPROVEMENT IN CULTIVATORS.

The Schedule referred to in these Letters Patent and making part of the same.

TO ALL WHOM IT MAY CONCERN:

Be it known that I, MARTIN BRENEMAN, of East Donegal Township, in the county of Lancaster, and State of Pennsylvania, have invented a new and useful Combination in Cultivators, convertible into a scorer, scraper, and shovel-harrow; and I do hereby declare that the following is a full, clear, and exact description of the construction and operation of the same, reference being had to the accompanying drawings, making a part of this specification, in which—

Figure 1 is a perspective view of the cultivator with all the shovels and parts, as such, in place.

Figure 2, the plough or scorer, being the same frame, with certain additions and changes in the shovels.

Figure 3, the same converted into a scraper.

Figure 4, a plan view of the frame as a cultivator for preparing the soil.

Figure 5, the same with the pole and handles reversed in position for the purpose of dressing corn after it is up, the side shovels on the longitudinal beams A A' only being used.

Figure 6, a single scraper with its rods shown.

Figure 7, a rear scoring shovel.

Figure 8, the ordinary cultivating shovel with its brace.

Figure 9, the detached axle and wheels, put on or taken off from the frame.

The nature of my invention consists in providing a framework for a cultivator of such a form, and united in such a manner with the necessary slots, and holes, or bolts, as to render it not only adjustable in itself, but readily convertible into four distinct implements, each of superior efficacy in the use it is intended for, thereby economizing room in storage and expense, and supplying a truly useful combination to meet all the requirements for working corn with entire satisfaction.

To enable others skilled in the art to make and use my invention, I will proceed to describe its construction and operation.

The frame in itself is much like that of other cultivators, only that in being made adjustable, so as to widen or contract the space between the furrows, I box out the side beams A A' at their junction with the cross-pieces B C D, which latter have a double tenon or open slot, of sufficient length to slide the beams in or out, with three holes in the cross-beams or brace for a headed bolt and nut, x. Figure 10 illustrates this joint. This mode of adjustment I believe new and better adapted and less liable to become loose in time. A single-headed bolt is shown in the middle hole at each interlapping joint of A, A', B, C, and D. There is also a slot, G, boxed out on the rear and front cross-piece B D for the short pole H, and a mortise in the middle cross-piece C, so that the short pole H can be applied to either end of the machine. The handles F can also be reversed by drawing the pin or bolt in the uprights E and cleat-bolt at their union, and setting the posts E in the holes 15 in the cross-piece B, and the cleat-bolt into the hole 13, on A, (fig. 5,) and removing the middle shovels 5, 8, and 9, and the implement is adapted to work the corn when up, by working up the soil on both sides of the growing corn. The shovels are numbered 1, 2, 3, 4, 5, 6, 7, 8, and 9, (shovels 5, 8, and 9, are hid by the cross-pieces C D, fig. 1, to which they are attached,) and are all employed in working the soil preparatory to scoring. For the purpose of scoring all the shovels are removed, the truck L M, with its headed bolts 12, and nuts x, is placed under the frame and fastened with the headed screw-bolts 12, (shown in figs. 2 and 3,) the scoring shovels T, fig. 7, are inserted on the rear end of the beams A A', at 7, 3, when two furrows can be drawn at once. The wheels steady the machine. A regular pole I is applied, held centrally in the cross-bolt k, with side braces J connected to the tongue or pole I, to steady and strengthen it; (of course the short pole H is removed.) This forms a superior plough or scoring machine, by simply adding the scrapers O, (fig. 6,) by inserting the rod-bolt S in the holes 14, in the cross-piece C, and the post Q, through the opening 10, on the beams A A'. The scrapers are firmly secured and braced by the rods R, adjusted by screw-end and double nuts x, that is, one on each side of the scraper. This completes the scraper. The scoring shovels T will draw a furrow in the rear of the scrapers and aid in collecting or retaining the water near the roots of the corn during a shower, and saves the necessity of a separate operation usually performed after the scraper has been employed to remove the grass between the rows, otherwise leaving a smooth tract, too apt to carry the water off without benefiting the growing corn after a shower of rain, as it does when furrows are drawn to loosen the soil or to form a barrier so as to absorb the water and carry it to the roots of the corn or crop. I find by making the shovels U, fig. 8, with a brace V fastened by a screw-bolt to the frame, makes them much firmer than when merely held by a screw and nut in the beam. I am aware that shouldered shovels have been used, but I am not aware that shovels with a brace attached, as shown by fig. 8, and on each shovel, in fig. 1. I am also aware that numerous adjustable cultivators are in use, and patented and made convertible for different purposes, by turning over or affixing and detaching certain parts, claiming their several specialities and combinations. My experience in farming and the desire to have an implement of the kind, has led me to examine the claims of various machines designed to supply the want felt by farmers generally. As none of those that came under my notice answered my expectations, I was induced to study and experiment, which finally resulted in the combination herein set forth, which in my humble opinion is one that will meet the approbation of the farming community. I am aware that my claims must be specific, having all the details and allotted points requisite to effect the several changes with ease and dispatch, and so arranged that, when changed, the implement will perform its office satisfactorily. I do not expect to be under the necessity to alter any part, and consequently present it rather as a whole, than as having any special novelty in its several parts. I therefore do not claim any part of the cultivator independently considered.

Therefore, what I claim as my invention, and desire to secure by Letters Patent, is—

The special arrangement and construction of the frame A, A', B, C, D, in combination with the reversible handles F, and holes 10, 12, 13, 14, and 15, adapted for the reception and application of the axle and wheels L M, scrapers O P, all constructed and operating in the manner and for the purpose specified.

MARTIN BRENEMAN.

Witnesses at signing:
  WM. B. WILEY,
  JACOB STAUFFER.